(12) United States Patent
Pettit

(10) Patent No.: US 12,082,075 B2
(45) Date of Patent: *Sep. 3, 2024

(54) SYSTEMS AND METHODS FOR INTERCEPT DIRECTING IN A MONITORING SYSTEM

(71) Applicant: BI Incorporated, Boulder, CO (US)

(72) Inventor: Dustin Pettit, Boulder, CO (US)

(73) Assignee: BI Incorporated, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,689

(22) Filed: Apr. 21, 2023

(65) Prior Publication Data

US 2023/0269561 A1    Aug. 24, 2023

Related U.S. Application Data

(63) Continuation of application No. 17/021,847, filed on Sep. 15, 2020, now Pat. No. 11,665,507.

(51) Int. Cl.
| | | |
|---|---|---|
| H04W 4/029 | (2018.01) | |
| G08B 21/22 | (2006.01) | |
| H04W 4/021 | (2018.01) | |
| H04W 12/80 | (2021.01) | |

(52) U.S. Cl.
CPC ............ *H04W 4/029* (2018.02); *G08B 21/22* (2013.01); *H04W 4/021* (2013.01); *H04W 12/80* (2021.01)

(58) Field of Classification Search
CPC ...................................... H04W 4/029
USPC .................................................... 455/456.3
See application file for complete search history.

(56) References Cited

U.S. PATENT DOCUMENTS

| | | | | |
|---|---|---|---|---|
| 5,731,757 A * | 3/1998 | Layson, Jr. | ............. | C08B 21/00 340/573 |
| 5,867,103 A * | 2/1999 | Taylor, Jr. | ........... | G08B 21/0283 379/38 |
| 7,330,122 B2 * | 2/2008 | Derrick | .............. | G08B 21/0286 379/38 |
| 7,619,513 B2 * | 11/2009 | Hill | ........................ | G07C 9/28 348/143 |
| 7,804,412 B2 * | 9/2010 | Derrick | .............. | G08B 21/0261 379/38 |
| 7,936,262 B2 * | 5/2011 | Derrick | .................... | G07C 9/28 340/539.19 |
| 7,961,092 B2 * | 6/2011 | Freathy | .................... | G07C 9/28 340/539.11 |
| 11,665,507 B2 * | 5/2023 | Pettit | ....................... | G08B 21/22 455/456.3 |
| 2002/0140559 A1 * | 10/2002 | Zhou | ...................... | A61B 5/681 340/988 |
| 2010/0123589 A1 * | 5/2010 | Buck | .................. | G08B 21/0269 340/573.4 |
| 2017/0238136 A1 * | 8/2017 | Smith | ............... | H04M 1/72457 455/456.3 |
| 2020/0367039 A1 * | 11/2020 | Shaw | .................. | H04W 28/021 |

* cited by examiner

*Primary Examiner* — Qutbuddin Ghulamali
(74) *Attorney, Agent, or Firm* — Osha Bergman Watanabe & Burton LLP

(57) ABSTRACT

Various embodiments of the present invention provide systems and method for supporting target intercept directing.

39 Claims, 7 Drawing Sheets

SYSTEMS AND METHODS FOR INTERCEPT DIRECTING IN A MONITORING SYSTEM

CROSS REFERENCE TO RELATED APPLICATION

The present application claims priority to U.S. Provisional application Ser. No. 17/021,847 entitled "Systems and Methods for Intercept Directing in a Monitoring System" and filed Sep. 15, 2020 by Pettit. The entirety of the aforementioned reference is incorporated herein by reference for all purposes.

BACKGROUND OF THE INVENTION

Various embodiments of the present invention provide systems and method for supporting target intercept directing.

Large numbers of individuals are currently monitored as part of parole requirements or other requirements. Such monitoring allows a monitoring agency to determine whether the individual is engaging in acceptable patterns of behavior, and where an unacceptable behavior is identified to stop such behavior going forward. In many monitoring systems, the lack of up to date monitoring information limits the ability of a monitoring agency to support a pursuit of an individual operating outside of a defined acceptable pattern of behavior.

Thus, for at least the aforementioned reasons, there exists a need in the art for more advanced approaches, devices and systems for monitoring.

BRIEF SUMMARY OF THE INVENTION

Various embodiments of the present invention provide systems and method for supporting target intercept directing.

This summary provides only a general outline of some embodiments according to the present invention. Many other objects, features, advantages and other embodiments of the present invention will become more fully apparent from the following detailed description, the appended claims and the accompanying drawings and figures.

BRIEF DESCRIPTION OF THE DRAWINGS

A further understanding of the various embodiments of the present invention may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
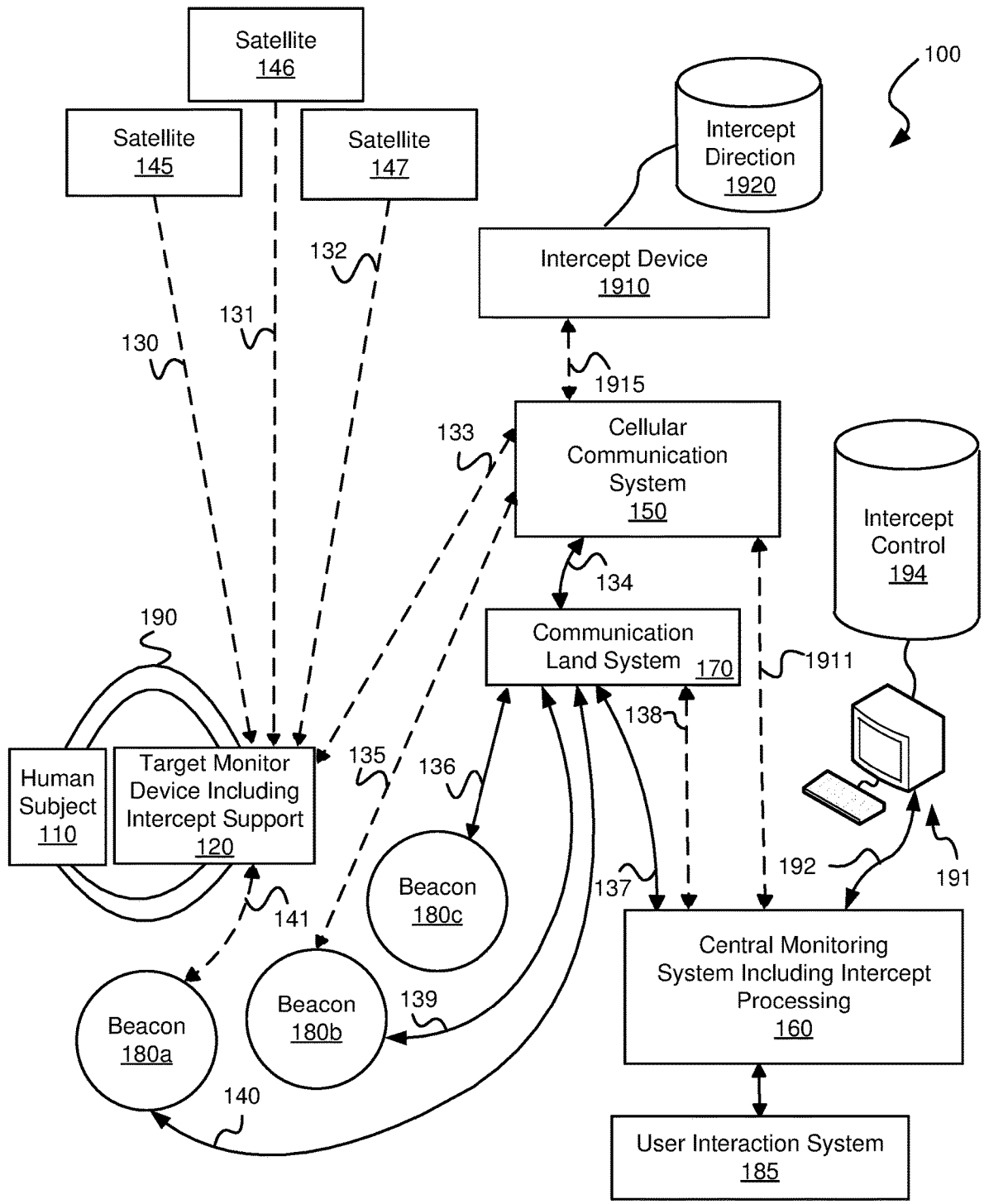
FIG. 1a is a block diagram illustrating a monitoring system including intercept processing in accordance with various embodiments.

Various embodiments of the present invention provide systems and method for supporting target intercept directing.

Some embodiments provide monitoring systems that include a monitoring device. The monitoring device includes: a location determination circuit, and controller circuit. The location determination circuit is configured to identify a first location of the monitoring device at a first time, identify a second location of the monitoring device at a second time, and identify a third location of the monitoring device at a third time. The controller circuit is configured to: provide the first location to a first recipient device via a wide area network while operating in a first mode; receive a request to operate in a second mode; and provide the second location and the third location to both the first recipient device and a second recipient device via the wide area network while operating in a first mode.

In some instances of the aforementioned embodiments where the first recipient device is a central monitoring station and the second recipient device is an intercept device, and the request to operate in the second mode is received from the central monitoring station. In some cases, the central monitoring station is configured to receive a user request to engage the second mode, and to generate the request to operate in the second mode.

In various instances of the aforementioned embodiments, the location determination circuit updates location information at a first rate when operating in the first mode, and updates location information at a second rate when operating in the second mode. In some cases, the first rate is less than the second rate. In other cases, the first rate is the same as the second rate. In yet other cases, the second rate is less than the first rate.

In one or more instances of the aforementioned embodiments where the location determination circuit is a first a location determination circuit and the second recipient device is an intercept device, the intercept device includes: a second location determination configured to identify a fourth location of the intercept device; a processor; and a computer readable medium including non-transient instructions executable by the processor to identify a possible intersection location based at least in part on the second location, the third location, and the fourth location. In some cases, the non-transient instructions executable by the processor to identify the possible intersection location based at least in part on the second location, the third location, and the fourth location includes instructions executable by the processor to calculate a velocity and direction of the monitor device based at least in part on the second location and the third location. In some cases, the intercept device further includes a display. In such cases, the computer readable medium further includes non-transient instructions executable by the processor to display: a first graphic of the monitor device at the third location, a second graphic of the intercept device at the fourth location, and a third graphic at the possible intersection location.

In various instances of the aforementioned embodiments, the computer readable medium further includes non-transient instructions executable by the processor to determine a path between the fourth location and the possible intersection location. In some cases, the intercept device further includes a display. In such cases, the computer readable medium further includes non-transient instructions executable by the processor to display: a first graphic of the monitor device at the third location, a second graphic of the intercept device at the fourth location, a third graphic at the possible intersection location, and a fourth graphic indicating the path.

Various embodiments provide methods for directing intercept of a monitor target. The methods include: using a location determination circuit of a monitor device to determine a first location of the monitor device at a first time; communicating the first location from the monitor device to a first recipient device via a wide area network while operating in a first mode; receiving a request to engage in a second mode from the first recipient device via the wide area network; using the location determination circuit of the monitor device to determine a second location of the monitor device at a second time; communicating the second location from the monitor device directly to the first recipient via the wide area network while operating in the second mode, and communicating the second location from the monitor device directly to a second recipient via the wide area network while operating in the second mode; using the location determination circuit of the monitor device to determine a third location of the monitor device at a third time; communicating the third location from the monitor device directly to the first recipient via the wide area network while operating in the second mode, and communicating the third location from the monitor device directly to the second recipient via the wide area network while operating in the second mode.

Turning to FIG. 1a, a monitoring system 100 including intercept processing is shown in accordance with various embodiments of the present invention. Monitoring system 100 may be tailored for tracking human subjects, however, it should be noted that various implementations and deployments of monitoring system 100 may be tailored for tracking non-human targets such as, for example, other animals or inanimate assets or objects. Such inanimate assets or objects may include, but are not limited to, automobiles, boats, equipment, shipping containers or the like. In one particular embodiment, monitoring system 100 is tailored for tracking delivery vehicles. Based upon the disclosure provided herein, one of ordinary skill in the art will recognize a variety of individuals, animals and/or assets that may be monitored in accordance with different embodiments of the present invention, and/or different monitoring scenarios or systems that may be modified to incorporate one or more features disclosed herein.

Monitoring system 100 includes, but is not limited to, a target monitor device 120 that is physically coupled to a human subject 110 by a securing device 190. In some cases, securing device 190 is a strap that includes a tamper sensor 151 that may be, but is not limited to, a continuity sensor that when broken indicates an error or tamper condition. Further, in some cases, tamper sensor 151 may be implemented as a proximity sensor that is able to detect when it has been moved away from an individual being monitored. When such movement away from the individual is detected, an error or tamper condition may be indicated. Based on the disclosure provided herein, one of ordinary skill in the art will recognize a variety of tamper sensors that may be incorporated in either target monitor device 120 or securing device 190 to allow for detection of removal of target monitor device 120 or other improper or unexpected meddling with target monitor device 120. Further, based upon the disclosure provided herein, one of ordinary skill in the art will recognize a variety of monitor devices and/or securing devices that may be appropriate where the target of the monitoring is not a human or other animal subject, but rather an asset.

Target monitor device 120 is designed to provide the location of human subject 110 under a number of conditions. For example, when target monitor device 120 is capable of receiving wireless satellite location information 130, 131, 132 from a sufficient number of satellites 145, 146, 147 respectively, target monitor device 120 may use the received wireless satellite location information to calculate or otherwise determine the location of human subject 110. Alternatively, or in addition, the location of a beacon 180 that is local to target monitor device 120 may be used as the location of target monitor device 120. As yet another alternative, a number of WiFi access points (not shown) may be used to triangulate the location of monitor device 120. Alternatively, or in addition, other types of earth-based triangulation may be used in accordance with different embodiments of the present invention. Based on the disclosure provided herein, one of ordinary skill in the art will recognize other types of earth-based triangulation that may be used.

As yet another alternative, an AFLT fix may be established based on cellular communications between target monitor device 120 and a cellular communication system 150. Furthermore, when wireless communication link 133 between target monitor device 120 and cellular communications system 150 is periodically established, at those times, target monitor device 120 may report status and other stored records including location fixes to a central monitoring system 160 via wireless communication link 138.

Monitoring system 100 may include, but is not limited to, at least one beacon 180. Beacons 180 are instrumental for beacon-based monitoring systems. Within FIG. 1, a telemetric wireless link 141 has been depicted between beacon 180a and target monitor device 120. Each beacon 180 has an adjustable range to make telemetric wireless contact with target monitor device 120. At any point in time, depending on each beacon's 180 relative distance to target monitor device 120, none, one, or more than one tracking beacons 180 may be within transmission range of a single target monitor device 120. Likewise, it is further conceivable under various circumstances that more than one target monitor device 120 at times be within in range of a solitary beacon 180.

Telemetric wireless communications path 141 established at times between tracking beacon 180a and target monitor device 120 illustrates a common feature of various different embodiments of the current invention. Some embodiments of the various inventions vary on how, i.e. protocol, and what information and/or signaling is passed over wireless link 141. For example, in more simplified configurations and embodiments, each beacon 180 is limited to repetitively transmitting its own beacon ID and physical location information. In that way, once target monitor device 120 is within transmission range of tracking beacon 180a and establishes wireless or wired reception 141, then target monitor device 120 can record and store received beacon ID and location information. At a later time, for some embodiments of the present invention, target monitor device 120 can then report recorded readings from beacons 180 to the central monitoring system 160 over the cellular communication system 150 using wireless links 133 and 138 as depicted in FIG. 1a. Furthermore, many embodiments allow for such transmissions and information passing to occur without being noticed by human subject 110, and unnoticed, automatically, and near effortlessly central monitoring system 160 is able to establish records and track human subject's 110 movements and whereabouts.

In other embodiments or configurations, each beacon 180 also transmit status information related to its own device health and information related from each beacon's 180 internal tampering, movement, or other sensors via a communication system 170 to central monitoring system 160. This allows for detection of movement of beacons 180, and establishing some level of confidence that the location reported by each of beacons 180 is accurate. Various other details about a beacon-based system are disclosed in U.S. patent application Ser. No. 12/041,746 entitled "Beacon Based Tracking Devices and Methods for Using Such" and filed Mar. 4, 2008 by Buck et al. The entirety of the aforementioned reference is incorporated herein by reference for all purposes.

Likewise, in some other embodiments, each target monitor device 120 contains a host of their own power status, tampering, shielding, movement, and/or other sensors related to its own device health. While still further embodiments also include a host of other measurement transducers within target monitor device 120 for extracting information, and for later reporting, related to physical properties of human subject 110. For example, measuring for the presence of alcohol and/or other drugs present in human subject 110 may be included in some embodiments of target monitor device 120. As one example, the alcohol sensor discussed in U.S. Pat. No. 7,930,927 entitled "Transdermal Portable Alcohol Monitor and Methods for Using Such" and filed by Cooper et al. on Mar. 4, 2008. The entirety of the aforementioned reference is incorporated herein by reference for all purposes.

Beacons 180 in alternative embodiments of the present invention may communicate with central monitoring system 160 independently of target monitor device 120. The monitoring system 100 illustrated in FIG. 1a shows beacon 180b having both a wireless communication link 135 with cellular communication system 150, and also illustrates beacon 180b having a hardwired communication link 139 with land communication system 170. Monitoring system 100 is also shown with beacons 180a, 180b, and 180c each having hardwired land communication links 140, 139, and 136 respectively to land communication system 170. Monitoring system 100 further illustrates land communication system 170 having a hardwired communication link 134 to cellular communication system 150, and a hardwired communication link 137 to central monitoring system 160.

In some embodiments of the present invention, beacons 180 are located in areas frequented by human subject 110 where target monitor device 120 is incapable of accessing information from the GPS system. Such beacons eliminate the need to perform an earth-based location process and avoid the costs associated therewith. As an example, human subject 110 may have a tracking beacon 180 placed within his home, and one also placed at his place of employment in close proximity to his work area. In this way, the two placed beacons, each at different prescribed times, can interact with his attached target monitor device 120 to periodically make reports to central monitoring system 160 to track movements and the whereabouts of human subject 110. All this can be done without incurring the costs associated with, for example, triangulating using WiFi access points.

Monitoring system 100 further includes a control station 191 that is communicably coupled to central monitoring system 160 via a communication link 192. In one particular embodiment of the present invention, control station 191 is a personal computer including a display device, a processor, and/or one or more I/O devices. Based upon the disclosure provided herein, one of ordinary skill in the art will recognize a variety of systems that may be used as control station 191 including highly tailored application specific control systems. A storage medium 194 is communicably coupled to control station 191 and maintains instructions governing the operation of intercept processing in relation to central monitoring system 160 and target monitor device 120.

Central monitoring system 160 includes functionality for sending alerts to a user interaction system 185 when a tracked target ventures into a prohibited zone as updated by the adaptive zone update control, for providing location information indicating a location of target monitor device 120, and/or for receiving a request to place target monitor device 120 into an intercept processing mode. Various implementations and/or aspects of intercept processing implemented across central monitoring system 160 and target monitor device 120 are more fully described below in relation to FIGS. 2-4 below. User interaction system 185 may be, but is not limited to, a law enforcement computer deployed at a dispatch station of the law enforcement facility or a hand held computer maintained by a law enforcement official. As used herein, the term "computer" is used in its broadest sense to be any device or system including a processor capable of executing software and/or firmware instructions. The term "hand held computer" is used in its broadest sense to mean any portable computer with a mobile power source such as, for example, a battery. As just some examples, a hand held computer may be, but is not limited to, a smart phone, a laptop computer, or a tablet computer. Based upon the disclosure provided herein, one of ordinary skill in the art will recognize a variety of user interaction systems 185 that may be used in relation to one or more of the embodiments discussed herein. Further, it should be noted that such a system is not limited to use in relation to law enforcement.

Where intercept processing is triggered, one or more intercept assets (each carrying a respective intercept device 1910) is requested to participate in an intercept via a communication sent from central monitoring station 160 via wireless communication links 1911, 1915 and cellular communication system 150. Intercept device 1910 may be any device known in the art that includes a display and can communicate via one or more wireless communication systems. As just some examples, intercept device 1910 may be, but is not limited to, a cellular telephone, a personal digital assistant, a tablet, or a laptop computer. Based upon the disclosure provided herein, one of ordinary skill in the art will recognize a variety of devices that may be used as intercept devices in accordance with different embodiments. In some embodiments, intercept device 1910 includes at least a display, a user input device, a processor, and a wireless communication circuit, and is communicably coupled to a storage medium 1920 that includes intercept direction instructions 1920 executable by a processor included as part of intercept device 1910.

When an intercept asset agrees to participate in an ongoing intercept, central monitoring station 160 communicates an instruction to target monitor device 120 to provide location updates directly to intercept device 1910 via wireless communication links 133, 1915 and cellular communication system 150 (i.e., not indirectly from target monitor device 120 via central monitoring station 160). An intercept asset may be any person or device that has the capability of pursuing and intercepting a monitored individual associated with a target monitor device. An intercept asset may be, but is not limited to, a parole officer, a police officer, a parent, or a mechanical drone. Based upon the disclosure provided herein, one of ordinary skill in the art will recognize a variety of intercept assets that may be involved in different embodiments. Direct communication between target monitor device 120 and intercept device 1910 eliminates processing latency incurred by location information being first received by central monitoring station 160 and subsequently forwarded to intercept device 1910. In addition, intercept direction instructions 1920 are executed by the processor to display a location of intercept device 1910 relative to target monitor device, and to display an intercept location and intercept route. Additional discussion of intercept device 1910 and processes associated therewith is provided below in relation to FIGS. 3-4.

Figure 1B:
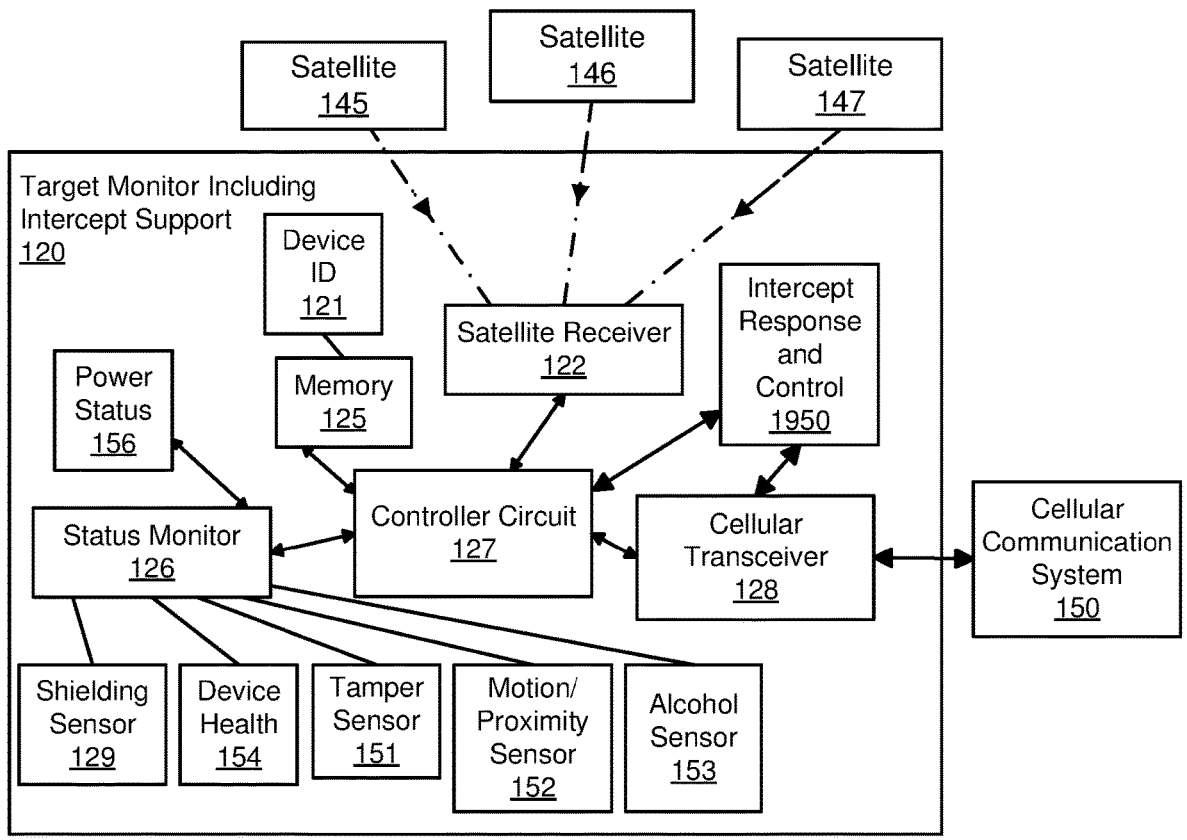
FIG. 1b is a block diagram of a target monitor device including intercept processing support in accordance with one or more embodiments.

Turning to FIG. 1b, a block diagram of target monitor device 120 including intercept processing support is shown in accordance with various embodiments. As shown, target monitor device 120 includes a device ID 121 that may be maintained in a memory 125, and thus is accessible by a controller circuit 127. Controller circuit 127 is able to interact with a satellite receiver 122 and memory 125 at times for storing and generating records of successively determined satellite-based locations. Satellite receiver 122 may be any receiving device capable of calculating or otherwise discerning the location of target monitor device using location information from one or more satellites 145, 146, 147.

Target monitor device 120 includes an intercept response and control module 1950. When target monitor device 120 receives a command via cellular transceiver 128 from central monitoring station 160 (not shown) intercept response and control module 1950 modifies operation of target monitor device 120 from the standard, non-intercept mode. In particular, the command to operate in an intercept mode received from central monitoring station 160 (not shown) indicates one or more intercept devices 1910 (e.g., a cellular telephone number of the device). When target monitor device 120 is operating in an intercept mode, controller circuit 127 causes an update and reporting of the location of target monitor device to both central monitoring station 160 (not shown) and one or more intercept devices 1910 (not shown) via cellular transceiver 128 and cellular communication system 150 in accordance with a second time period. This is in contrast to the non-intercept mode where controller circuit 127 causes an update and reporting of the location of target monitor device to central monitoring station 160 (not shown) via a cellular transceiver 128 and a cellular communication system 150 in accordance with a first time period. In some embodiments, the second time period is substantially shorter than the first time period. In one particular embodiment, the first time period is three minutes and the second time period is fifteen seconds. Based upon the disclosure provided herein, one of ordinary skill in the art will recognize other durations for the first time period and the second time period in accordance with different embodiments of the present invention. In some embodiments of the present invention, one or both of the first time period and the second time period is/are user programmable. Operating target monitor device 120 in the intercept mode consumes substantially more power than in the non-intercept mode where the first time period is substantially larger than the second time period. Thus, in some cases, where power is a concern, the first time period may be equal to the second time period or not much larger than the second time period. Controller circuit 127 may be, but is not limited to, an application specific circuit configured to perform control functions for target monitor. Memory 125 may be any type of memory known in the art such as, for example, a EEPROM or RAM memory. In some cases where controller circuit 127 executes instructions, such instructions may be maintained in memory 125.

Controller circuit 127 of target monitor device 120 at times functions in conjunction with cellular transceiver 128 to send and receive data and signals through cellular communication system 150. This link at times is useful for passing information and/or control signals between a central monitoring system (not shown) and multi-purpose monitoring device 120. The information transmitted may include, but is not limited to, location information, alcohol information, and information about the status of multi-purpose monitoring device 120. Based on the disclosure provided herein, one of ordinary skill in the art will recognize a variety of information that may be transferred via cellular communication system 150.

Various embodiments of target monitor device 120 include a variety of sensors capable of determining the status of target monitor device 120, and of the individual associated therewith. For example, a status monitor 126 may include one or more of the following subcomponents: a power status sensor 156 capable of indicating a power status of target monitor device 120. The power status may be expressed, for example as a percentage of battery life remaining. Based upon the disclosure provided herein, one of ordinary skill in the art will recognize a variety of forms in which power status may be expressed. In addition, target monitor device 120 includes a set of shielding sensors 129 that are capable of determining whether target monitor device 120 is being shielded from receiving GPS signals and/or if GPS jamming is ongoing, a set of device health indicators 154, a tamper sensor 131 capable of determining whether unauthorized access to target monitor device 120 has occurred or whether target monitor device 120 has been removed from an associated human subject, a motion/proximity sensor 152 capable of determining whether target monitor device 120 is moving and/or whether it is within proximity of an individual associated with target monitor device 120, and/or an alcohol sensor 153 such as that described herein. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into target monitor device 120 according to various different instances and/or embodiments of the present invention.

Figure 1C:
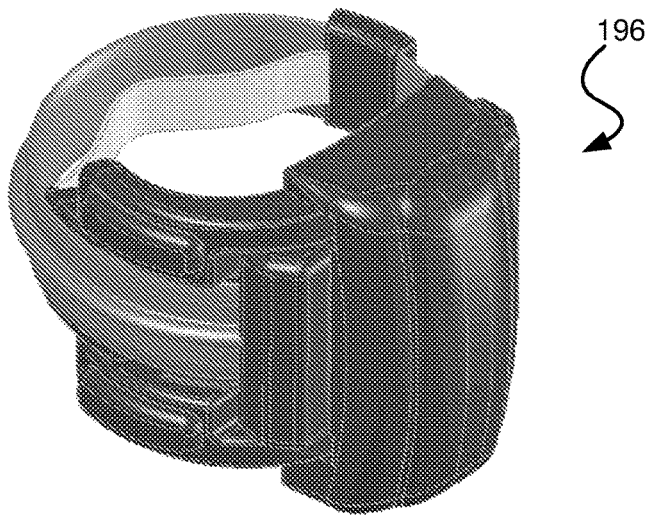
FIG. 1c shows a target monitor device including intercept processing support in accordance with one or more embodiments.

Turning to FIG. 1c, one implementation 196 of a combination of target monitor device 120 and strap 190 is shown in accordance with one or more embodiments.

Figure 2:
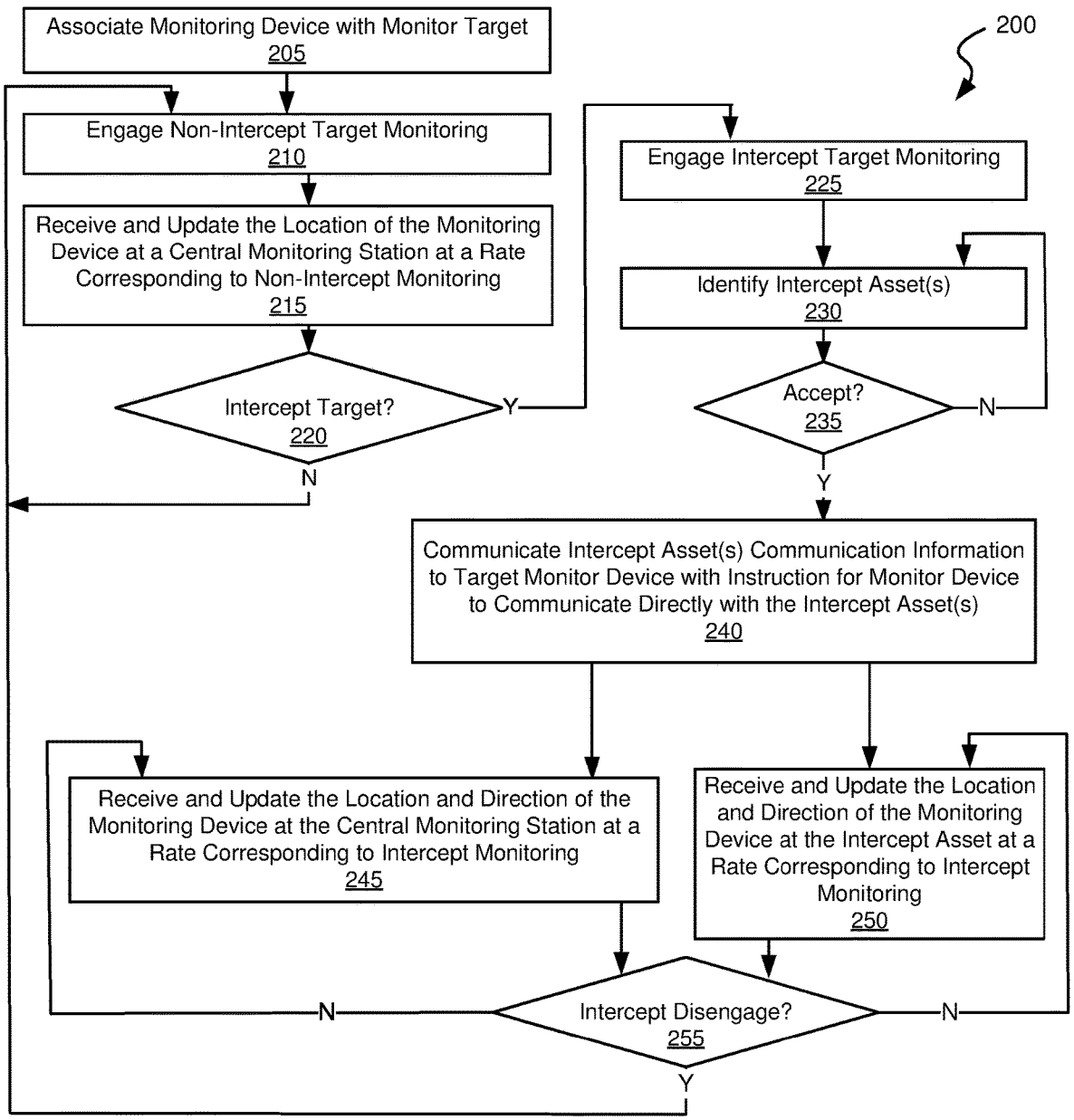
FIG. 2 is a flow diagram depicting a method for selective intercept mode engagement, processing, and return in accordance with some embodiments.

Turning to FIG. 2, a flow diagram 200 depicts a method for selective intercept mode engagement, processing, and return in accordance with some embodiments. Following flow diagram 200, a monitor device is associated with a monitor target (block 205). Where the monitor target is a human subject, associating the monitor device with the monitor target may include placing the monitor device in a pouch maintained by the human subject or physically attaching the monitoring device to the human subject using, for example, a strap or bracelet. Alternatively, where the monitor target is a non-human asset, associating the monitor device with the monitor target may include placing the monitor device inside the target or otherwise attaching the monitor device to the target. Based upon the disclosure provided herein, one of ordinary skill in the art will appreciate a variety of ways that a monitor device may be associated with a target.

Initially non-intercept target monitoring control is engaged (block 210). In non-intercept target monitoring control, target monitor device 120 updates its location and reports the location at a frequency corresponding to a first time period. Such updating includes target monitor device 120 enabling location circuitry at the end of each repeat of the first time period to obtain location information, and enabling communication circuitry to transmit the location information to central monitoring system 160. The first time period may either be fixed or user programmable, and is selected as a balance between extending the battery life of target monitor device 120 and providing a reasonably updated indication of the location of target monitor device 120. In one particular embodiment of the present invention, the first time period is three minutes. Based upon the disclosure provided herein, one of ordinary skill in the art will recognize other periods that may be used in relation to different embodiments of the present invention.

With the non-intercept control engaged (block 210), location information from target monitor device 120 is received in accordance with the non-intercept timing (i.e., repetitively at the end of completion of the first time period) (block 215). Such reception of location information includes central monitoring system 160 receiving location information from target monitor device 120 via cellular communication system 250 at the end of completion of each of the first time period. It should be noted that other communication links such as WiFi may be used in relation to other embodiments.

It is determined whether a request to intercept a target associated with target monitor device 120 has been received (block 220). Such a request to intercept may be received from, for example, user interaction system 185. Where a request to intercept has not been received (block 220), processing continues in accordance with the non-intercept control where the timing of location updates corresponding to the first time period and communication of the location updates being directed to central monitor station 160 where they are analyzed and stored.

Alternatively, where an intercept is requested (block 220), intercept target monitoring control is engaged (block 225). In intercept target monitoring control, target monitor device 120 updates its location and reports the location based upon a second time period. In addition, the location information is communicated directly from target monitor device 120 to one or more intercept assets each associated with a respective intercept device 1910, and also to central monitoring station 160. Such updating includes target monitor device 120 enabling location circuitry at the end of each repeat of the second period to obtain location information, and enabling communication circuitry to transmit the location information to central monitoring system 160 and one or more indicated intercept assets. The second time period may either be fixed or user programmable, and modifies the balance between extending the battery life of target monitor device 120 and providing a reasonably updated indication of the location of target monitor device 120 of the first time period such that an updated indication of the location of target monitor is received more often at the expense of the battery life of target monitor device 120. In one particular embodiment, the second period is fifteen seconds. Based upon the disclosure provided herein, one of ordinary skill in the art will recognize other periods that may be used in relation to different embodiments.

With the intercept control engaged (block 225), one or more intercept assets are identified (block 230). Such identification may proceed in accordance with rules programmed in central monitoring station 160. For example, where target monitor device 120 is associated with a mentally handicapped child, the rule may indicate that the intercept assets include the parents of the child. As another example, where target monitor device 120 is associated with a recently paroled individual subject to strict monitoring, the rule may indicate that the intercept asset is a police officer. Each set of intercept asset rules for each target monitor device 120 may be maintained by central monitoring station 160, or default rules may be selectable when target monitor device 120 is associated with the target. Based upon the disclosure provided herein, one of ordinary skill in the art will recognize a variety of intercept asset rules that may be used in relation to different embodiments.

A request to perform the intercept is communicated to an intercept device 1910 associated with each of the respectively identified intercept assets and it is determined whether the request was accepted (block 235). In some embodiments, the request to perform the intercept is texted to the respective intercept device 1910, and the intercept asset presses a button on intercept device 1910 indicating either an acceptance of a decline of the request. The acceptance or decline is returned back to central monitoring station 160. Identifying the intercept asset(s) includes identifying a contact information for respective identified assets. Such communication information may be, but is not limited to, a cellular telephone number of an intercept device 1910 used by the identified intercept asset. It is noted that while this embodiment is discussed as waiting on an acceptance the acceptance may be implied or expected, and in such a case the process of waiting on an acceptance may be eliminated.

Where an acceptance is nor received (block 240), the rules governing identification of intercept assets for the particular target monitor device 120 are revisited to identify another possible intercept asset (block 230). Alternatively, where one or more of the intercept assets accept the request (block 240), The communication information for the identified intercept asset(s) is communicated to the target monitor device 120 that is to be intercepted along with an instruction to engage intercept control (block 240). The command to engage intercept control causes target monitor device 120 to change the location update and reporting frequency to the second time period, and to begin communicating its location information directly to intercept devices 1910 associated with the identified intercept assets using the communication information received from central monitoring station 160. In addition, location information is also communicated to central monitoring station 160.

Once target monitor device 120 is switched to intercept control in accordance with the command from central monitoring station 160 (block 240). The location information from target monitor device 120 is received and updated in central monitoring station 160 at the rate corresponding to the second time period used during intercept control (block 245). In some embodiments this location information includes direction and/or velocity information that is also received. In other embodiments, direction and velocity information is calculated by central monitoring station 160 based upon a series of location updates. In parallel, the location information from target monitor device 120 is received and updated in intercept device(s) 1910 associated with the identified intercept asset(s) at the rate corresponding to the second time period used during intercept control (block 250). In some embodiments this location information includes direction and/or velocity information that is also received. In other embodiments, direction and velocity information is calculated by the receiving intercept device 1910 based upon a series of location updates.

The aforementioned process of operating in intercept control (blocks 245, 250) continues until intercept control is disengaged (block 255). Intercept control may be disengaged for a number of reasons. For example, and intercept asset may intercept and/or capture the monitored individual associated with target monitor device 120. In such a situation, the intercept asset sends a message to central monitoring station 160 indicating that the intercept is complete, and central monitoring station 160, either automatically or at the request of an individual interacting via user interaction station 185, sends a message to target monitor device 120 to revert to non-intercept target monitoring (block 210). As another example, central monitoring station 160 may receive a low power message from target monitor device 120, and in response central monitoring station 160 sends a message to target monitor device 120 to revert to non-intercept target monitoring (block 210). Based upon the disclosure provided herein, one of ordinary skill in the art will recognize a variety of reasons and/or processes for disengaging intercept control.

Figure 3A:
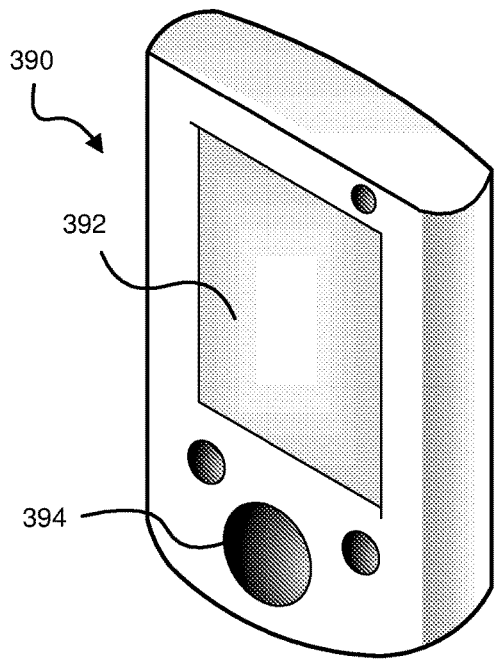
FIG. 3a shows an example of an intercept device that may be used by an intercept asset in accordance with some embodiments.

Turning to FIG. 3a, an example of an intercept device 390 is shown that may be used by an intercept asset in accordance with some embodiments. As shown, intercept device 390 incudes a display 392 and a user button 394. Display 392 can be used to display messages to an intercept asset using intercept device 390 including a request to accept an intercept assignment and/or graphical directions for intercepting a target. User button 394 may be used to accept or decline a request to intercept and/or select an input indicating an intercept is complete. It is noted that intercept device 390 is merely an example, and that one of ordinary skill in the art will recognize other types of intercept devices that may be used in relation to different embodiments.

Figure 3B:
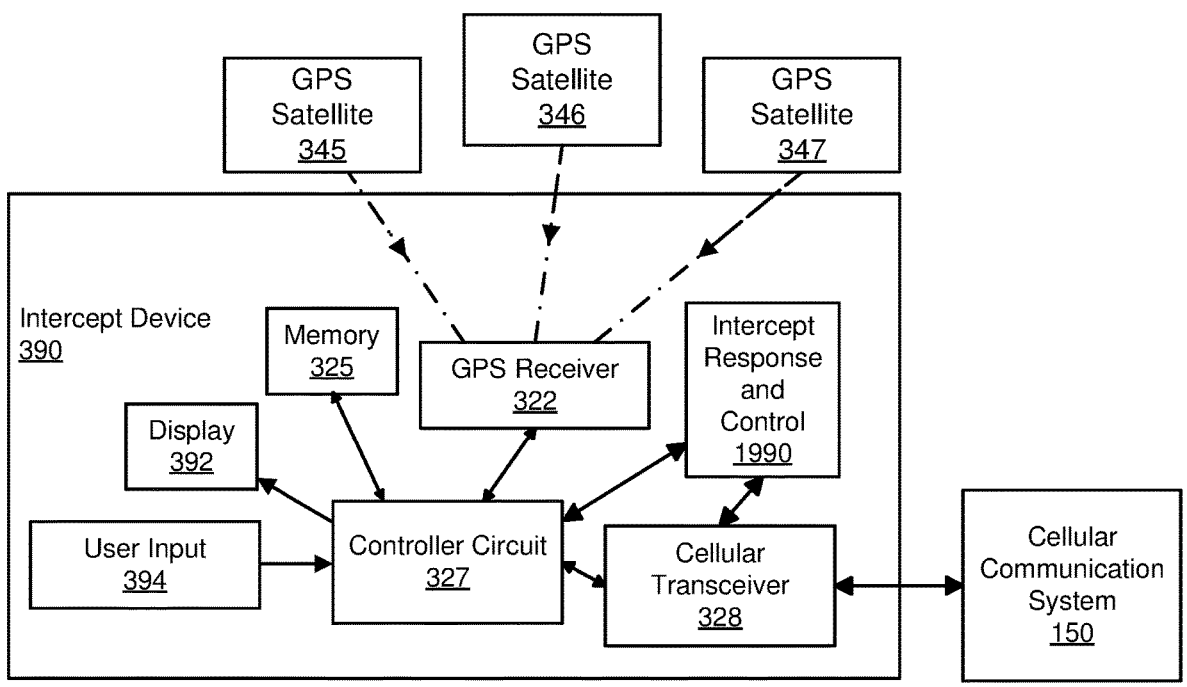
FIG. 3b is a block diagram of an intercept device in accordance with various embodiments.

Turning to FIG. 3b, a block diagram of intercept device 390 is shown in accordance with various embodiments. As shown, intercept device 390 includes a memory 325 accessible to a controller circuit 327. Controller circuit 327 is able to interact with a global positioning system (GPS) receiver 322 and memory 325 at times for storing and generating records of successively determined satellite-based locations of intercept device 390. Controller circuit 327 may be, but is not limited to, an application specific circuit configured to perform control functions for target monitor. Memory 325 may be any type of memory known in the art such as, for example, a EEPROM or RAM memory. In some cases where controller circuit 327 executes instructions, such instructions may be maintained in memory 325. GPS receiver 322 may be any receiving device capable of calculating or otherwise discerning the location of target monitor device using location information from one or more GPS satellites 345, 346, 347.

Intercept device 390 includes an intercept response and control module 1990. When intercept device 390 accepts a command received via a cellular transceiver 328 from central monitoring station 160 (not shown) to engage in an intercept, intercept response and control module 1950 begins receiving location information from a target monitor device 120, and begins updating display 392 to graphically represent the relative location of intercept device 390 and target monitor device 120 along with various points of geographic interest including roads and buildings.

Figure 3C:
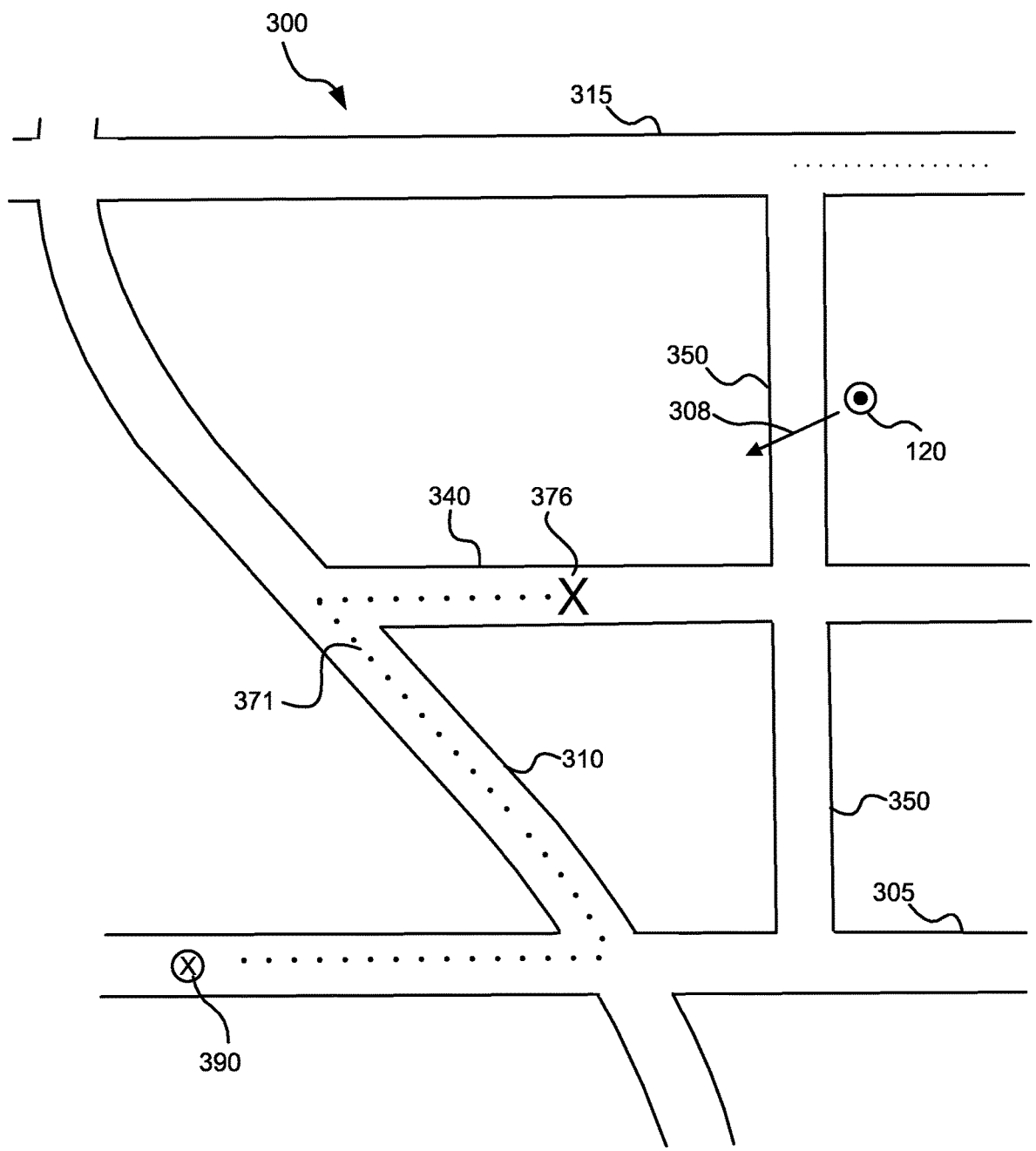
FIGS. 3c-3d graphically show two examples of an intercept graphic shown via a display of an intercept asset in accordance with various embodiments.

Turning to FIG. 3c, an example of a graphical display 300 that may be displayed via display 392 of intercept device 390 is shown in accordance with some embodiments. As shown, intercept device 390 is shown at its location that may be derived, for example, using GPS coordinates or other satellite-based or land-based location determination circuitry that may be included in intercept device 390. Intercept device 390 is shown relative to a number of roads 305, 310, 315, 340, 350. Additionally, target monitor device 120 is shown at its location indicated by the location information received by intercept device 390 from target monitor device 120. A direction and velocity of target monitor device 120 is graphically represented by an arrow 308 extending from target monitor device 120 on graphical display 300. The length of arrow 308 indicates velocity with a longer arrow indicating a higher velocity than a shorter arrow.

Using the relative locations of intercept device 390 and target monitor device 120 and the direction and velocity of target monitor device 120, controller 327 of intercept device 390 calculates a possible intersection location 376 between intercept device 390 and target monitor device 120, and plots a path to possible intersection point 376. The path is shown on graphical display 300 as a dotted path 371.

Possible intersection location 376 is identified by iteratively selecting a point along the direction indicated by arrow 308 and calculating a first time for intercept device 390 to arrive as the selected point and a second time for target monitor device 120 to arrive at the selected point based upon the velocity and direction of each of intercept device 390 and target monitor device 120, and any geographic features between each of intercept device 390 and target monitor device 120 and the possible intersection point 376. Once the first time and second time are about the same, the selected point is used as intersection point 376.

The relative location of intercept device 390 and target monitor device 120, and the direction and velocity of both intercept device 390 and target monitor device 120 are updated as new location information for each of the devices becomes available. This information is updated to graphical display 300 as it becomes available. In addition, intersection location 376 and dotted path 371 are updated and re-displayed as new location information becomes available. Thus, graphical display 300 is a dynamic display that changes to accommodate information as it receives, and to provide a display to an intercept asset that directs an intercept of target monitor device 120.

Figure 3D:
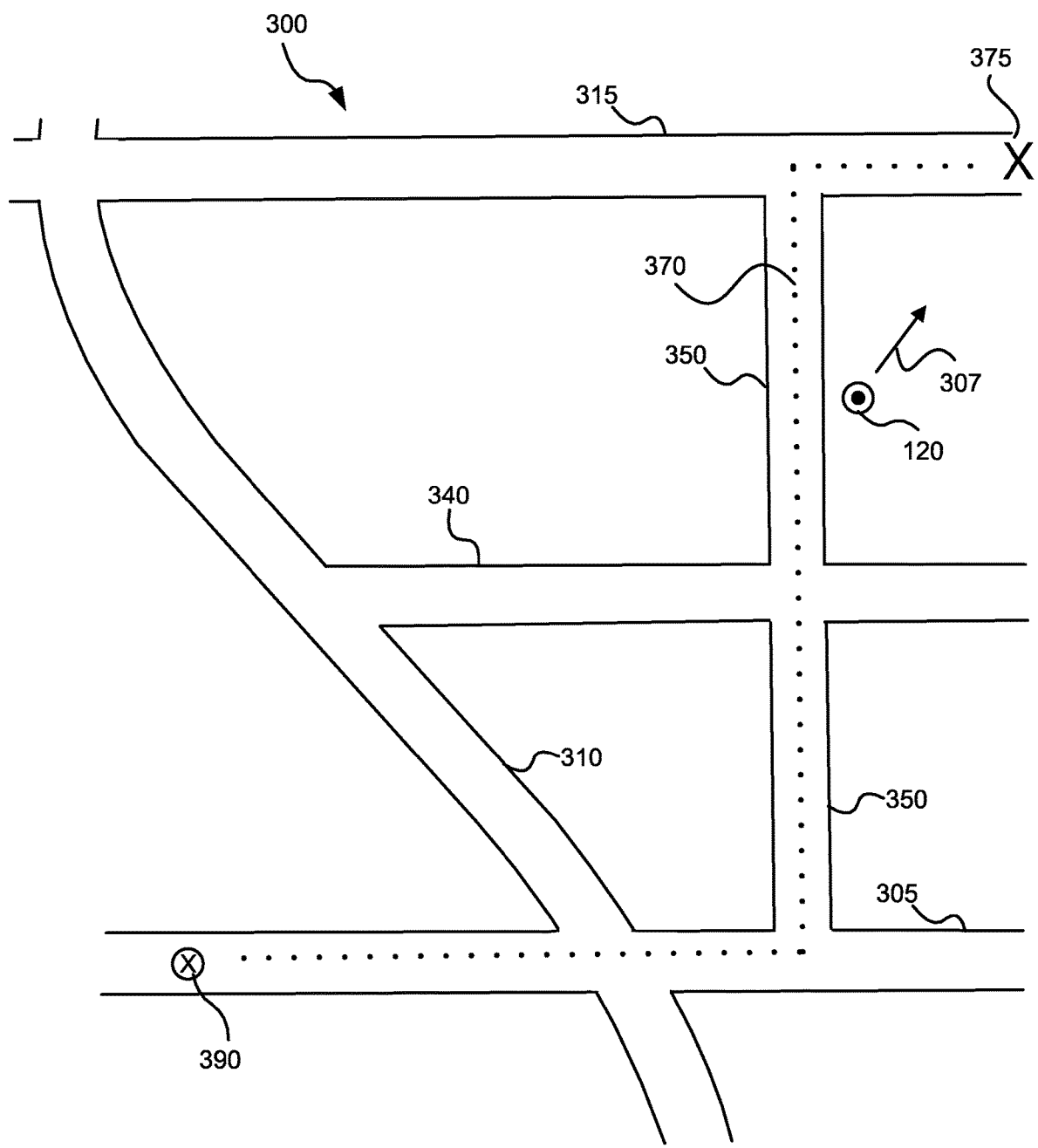

Turning to FIG. 3d, another example of a graphical display 300 that may be displayed via display 392 of intercept device 390 is shown in accordance with some embodiments. As shown, intercept device 390 and target monitor device 120 are shown relative to each other and various geographic features between each of intercept device 390 and target monitor device 120 including roads 305, 310, 315, 340, 350. A direction and velocity of target monitor device 120 is graphically represented by an arrow 307 extending from target monitor device 120 on graphical display 300. As before, the length of arrow 307 indicates velocity with a longer arrow indicating a higher velocity than a shorter arrow.

Using the relative locations of intercept device 390 and target monitor device 120 and the direction and velocity of target monitor device 120, controller 327 of intercept device 390 calculates a possible intersection location 375 between intercept device 390 and target monitor device 120, and plots a path to possible intersection point 375. The path is shown on graphical display 300 as a dotted path 370.

Possible intersection location 375 is identified similar to previously described possible intersection point 376. Similar to that described above in relation to FIG. 3c, the relative location of intercept device 390 and target monitor device 120, and the direction and velocity of both intercept device 390 and target monitor device 120 are updated as new location information for each of the devices becomes available. This information is updated to graphical display 300 as it becomes available. In addition, intersection location 375 and dotted path 370 are updated and re-displayed as new location information becomes available. Thus, graphical display 300 is a dynamic display that changes to accommodate information as it receives, and to provide a display to an intercept asset that directs an intercept of target monitor device 120.

Figure 4:
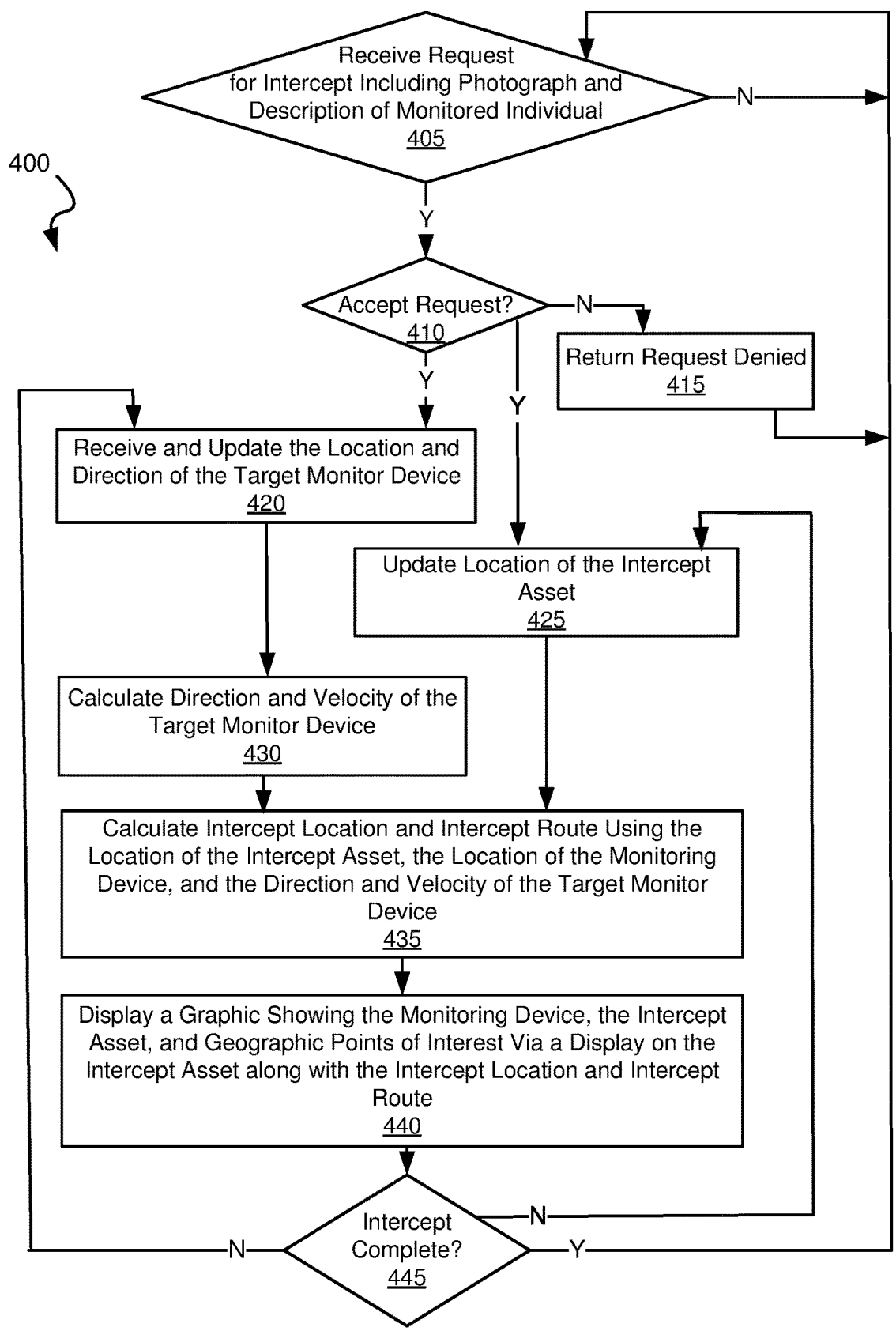
FIG. 4 is a flow diagram depicting a method for updating an intercept asset display in accordance with some embodiments.

Turning to FIG. 4, a flow diagram 400 shows a method for updating an intercept asset display in accordance with some embodiments. Following flow diagram 400, it is determined whether a request to engage in an intercept of a monitored target has been received (block 405). Such a request comes from central monitoring station 160 via cellular communication system 150 to an intercept device 390, and in some cases includes a description of the monitored target and/or a photograph of the monitored target.

Where a request to engage in an intercept is received (block 405), an intercept asset using intercept device 390 decides whether they will engage in the intercept or not (block 410). An intercept asset agrees to engage in the intercept by pressing an accept input included as part of intercept device 390. Where the intercept asset does not accept the request to engage in the intercept (block 410), a request denied is returned from intercept device 390 to central monitoring station 160 via cellular communication system 150 (block 415).

Alternatively, where the intercept asset does not accept the request to engage in the intercept (block 410), location updates indicating the current location of target monitor device 120 associated with the monitored target to be intercepted are received by intercept device 390 directly from target monitor device 120 via cellular communication system 420. These location updates are stored local to intercept device 390. Intercept device 390 calculates a direction and velocity of target monitor device 120 using a series of location updates received from target monitor device 120 (block 430). In addition, the location of intercept device 390 is updated using either satellite-based or ground-based location, and the updated location is stored local to intercept device 390 (block 425).

Using the relative locations of intercept device 390 and target monitor device 120, and the direction and velocity of target monitor device 120, intercept device 390 calculates a possible intersection location between intercept device 390 and target monitor device 120, and calculates a path from the current location of intercept device 390 to the identified possible intersection location (block 435). In some embodiments, the possible intersection location is calculated or identified by iteratively selecting a point along the direction of target monitor device and calculating a first time for intercept device 390 to arrive as the selected point and a second time for target monitor device 120 to arrive at the selected point based upon the velocity and direction of each of intercept device 390 and target monitor device 120, and any geographic features between each of intercept device 390 and target monitor device 120 and the possible intersection location. Once the first time and second time are about the same, the selected point is used as an intersection location.

The calculated intersection location and path between intercept device 390 and the intersection location is updated to a display on intercept device (block 440). The display is also updated to show the relative locations of intercept device 390 and target monitor device.

It is determined whether the intercept has been completed (block 445). The intercept may be indicated as complete by a message sent from central monitoring station 160 to intercept device 390 indicating that the intercept is complete, or by an intercept asset using intercept device 390 using a user interface of intercept device 390 to indicate that the intercept is complete. Based upon the disclosure provided herein, one of ordinary skill in the art will recognize a variety of ways in which intercept completion may be indicated or signaled. Where the intercept is not complete (block 445), the processes of blocks 425-445 are repeated. Such repetition results in a dynamically updating display on intercept device 390.

In conclusion, the present invention provides for novel systems, devices, and methods for intercepting monitored individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A monitoring system, the monitoring system comprising:
 a monitoring device including:
   a first location determination circuit configured to identify a first location of the monitoring device at a first time, identify a second location of the monitoring device at a second time, and identify a third location of the monitoring device at a third time; and
   a controller circuit configured to:
     provide the first location to a first recipient device while operating in a first mode;
     receive a request to operate in a second mode; and
     provide the second location and the third location to the second recipient device without passing through the first recipient device while operating in the second mode;
 the second recipient device including:
   a second location determination circuit configured to identify a fourth location of the second recipient device;
   a processor; and
   a computer readable medium communicably coupled to the processor and having stored therein instructions, which when executed by the processor, cause the processor to identify a possible intersection location based at least in part on the second location, the third location, and the fourth location.

2. The monitoring system of claim 1, wherein the instructions that cause the processor to identify the possible intersection location based at least in part on the second location, the third location, and the fourth location include instructions, which when executed by the processor, cause the processor to calculate a velocity and direction of the monitor device based at least in part on the second location and the third location.

3. The monitoring system of claim 1, wherein the first recipient device comprises a central monitoring station, wherein the second recipient device comprises an intercept device, and wherein the request to operate in the second mode is received from the central monitoring station.

4. The monitoring system of claim 3, wherein the central monitoring station is configured to receive a user request to engage the second mode, and to generate the request to operate in the second mode.

5. The monitoring system of claim 1, wherein the location determination circuit updates location information at a first rate when operating in the first mode, and updates location information at a second rate when operating in the second mode, and wherein the first rate is less than the second rate.

6. A non-transient computer readable medium having stored therein instructions, which when executed by a processor, cause the processor to:
 determine a first location of a monitor device at a first time;
 transmit the first location to a first recipient device while operating in a first mode;
 receive a request to engage in a second mode at a second time, wherein the second time is after the first time;
 determine a second location of the monitor device at a third time, wherein the third time is after the second time; and
 based upon the request to engage in the second mode, transmit the second location from the monitor device directly to the first recipient device and directly to a second recipient device.

7. The non-transient computer readable medium of claim 6, wherein the first recipient device comprises a central monitoring station, wherein the second recipient device comprises an intercept device, and wherein the request to operate in the second mode is received from the central monitoring station.

8. The non-transient-computer readable medium of claim 7, wherein the request includes an address of the second recipient device.

9. The non-transient computer readable medium of claim 6, wherein the second location is transmitted to the second recipient device via a communication network selected from a group consisting of: a wide area network, a cellular communications network, a WiFi network, a combination of a WiFi network and a cellular communications network, a combination of a WiFi network and a wide area network, a combination of a WiFi network and a cellular communications network, and a combination of a cellular communications network and a wide area network.

10. The non-transient computer readable medium of claim 6, wherein determining the first location of the monitor device includes accessing a location determination circuit configured to update location information at a first rate when operating in the first mode, and update location information at a second rate when operating in the second mode, and wherein the first rate is less than the second rate.

11. A non-transient computer readable medium having stored therein instructions, which when executed by a processor, cause the processor to:
 send a request for a first recipient device to change a monitor device to an intercept mode;
 receive a first location of the monitor device at a first time, wherein the first location is received directly from the monitor device when the monitor device is in the intercept mode;
 receive a second location of the monitor device at a second time, wherein the second location is received directly from the monitor device when the monitor device is in the intercept mode, and wherein the second time is after the first time;
 determine a third location of a second recipient device; and
 identify a possible intersection location based at least in part on the first location, the second location, and the third location.

12. The non-transient computer readable medium of claim 11, wherein the instructions that cause the processor to identify the possible intersection location based at least in part on the first location, the second location, and the third location include instructions, which when executed by the processor, cause the processor to calculate a velocity and direction of the monitor device based at least in part on the first location and the second location.

13. The non-transient computer readable medium of claim 11, wherein the first recipient device comprises a central monitoring station, wherein the second recipient device comprises an intercept device, and wherein the request to operate in the second mode is received from the central monitoring station.

14. The non-transient computer readable medium of claim 11, wherein the request includes an address of the second recipient device.

15. The non-transient computer readable medium of claim 11, wherein the instructions, which when executed by a processor, further cause the processor to:
 determine a path between the third location and the possible intersection location.

16. The non-transient computer readable medium of claim 11, wherein the instructions, which when executed by a processor, further cause the processor to:
 display a path between the third location and the possible intersection location.

17. A monitoring system, the monitoring system comprising:
 a monitoring device including:
  a location determination circuit configured to identify a first location of the monitoring device at a first time, identify a second location of the monitoring device at a second time, and identify a third location of the monitoring device at a third time; and
  a controller circuit configured to:
   provide the first location to a first recipient device while operating in a first mode;
   receive a request to operate in a second mode;
   provide the second location to the first recipient device while operating in the second mode; and
   provide the second location to the second recipient device without passing through the first recipient device while operating in the second mode.

18. The monitoring system of claim 17, wherein the first recipient device comprises a central monitoring station, wherein the second recipient device comprises an intercept device, and wherein the request to operate in the second mode is received from the central monitoring station.

19. The monitoring system of claim 18, wherein the central monitoring station is configured to receive a user request to engage the second mode, and to generate the request to operate in the second mode.

20. The monitoring system of claim 17, wherein the location determination circuit updates location information at a first rate when operating in the first mode, and updates location information at a second rate when operating in the second mode, and wherein the first rate is less than the second rate.

21. The monitoring system of claim 17, wherein the system includes the second recipient device, wherein the location determination circuit is a first a location determination circuit, wherein the second recipient device comprises an intercept device, and wherein the intercept device comprises:
　a second location determination configured to identify a fourth location of the intercept device;
　a processor;
　a non-transient computer readable medium having stored therein instructions, which when executed by the processor, cause the processor to identify a possible intersection location based at least in part on the second location, the third location, and the fourth location.

22. The monitoring system of claim 21, wherein the instructions, which when executed by the processor, cause the processor to identify the possible intersection location based at least in part on the second location, the third location, and the fourth location include instructions, which when executed by the processor, cause the processor to calculate a velocity and direction of the monitor device based at least in part on the second location and the third location.

23. A method for directing intercept of a monitor target, the method comprising:
　determining, by a monitor device, a first location of the monitor device at a first time;
　transmitting, by the monitor device, the first location to a first recipient device while operating in a first mode;
　receiving, by the monitor device, a request to engage in a second mode at a second time, wherein the second time is after the first time;
　determining, by the monitor device, a second location of the monitor device at a third time, wherein the third time is after the second time;
　transmitting, by the monitor device, the second location to the first recipient device while operating in the second mode; and
　based upon the request to engage in the second mode, transmitting, by the monitor device, the second location to the second recipient device without passing through the first recipient device while operating in the second mode.

24. The method of claim 23, wherein the first recipient device comprises a central monitoring station, wherein the second recipient device comprises an intercept device, and wherein the request to operate in the second mode is received from the central monitoring station.

25. The method of claim 23, wherein the second location is transmitted to the second recipient device via a communication network selected from a group consisting of: a wide area network, a cellular communications network, a WiFi network, a combination of a WiFi network and a cellular communications network, a combination of a WiFi network and a wide area network, a combination of a WiFi network and a cellular communications network, and a combination of a cellular communications network and a wide area network.

26. The method of claim 23, wherein determining the first location of the monitor device includes accessing a location determination circuit configured to update location information at a first rate when operating in the first mode, and update location information at a second rate when operating in the second mode, and wherein the first rate is less than the second rate.

27. A method for directing intercept of a monitor target, the method comprising:
　receiving, by a first recipient device, a first location of a monitor device at a first time;
　receiving, by the first recipient device, a request to engage in a second mode at a second time, wherein the second time is after the first time;
　transmitting, by the first recipient device, the request to engage in the second mode;
　receiving, by the first recipient device, a second location of the monitor device at a third time, wherein the third time is after the second time, and wherein the second location is also received by a second recipient device directly from the monitor device while operating in the second mode;
　receiving, by the first recipient device, a third location of the monitor device at a fourth time, wherein the fourth time is after the third time, and wherein the third location is also received by the second recipient device directly from the monitor device while operating in the second mode;
　receiving, by the first recipient device, a fourth location of the second recipient device; and
　identifying, by the first recipient device, a possible intersection location of the second recipient device and the monitor device based at least in part on the second location, the third location, and the fourth location.

28. The method of claim 27, wherein identifying the possible intersection location of the second recipient device and the monitor device based at least in part on the second location, the third location, and the fourth location includes calculating a velocity and direction of the monitor device based at least in part on the second location and the third location.

29. The method of claim 27, wherein the first recipient device comprises a central monitoring station, wherein the second recipient device comprises an intercept device, and wherein the request to operate in the second mode is received from the second recipient device.

30. The method of claim 27, wherein the first location is transmitted to the first recipient device via a communication network selected from a group consisting of: a wide area network, a cellular communications network, a WiFi network, a combination of a WiFi network and a cellular communications network, a combination of a WiFi network and a wide area network, a combination of a WiFi network and a cellular communications network, and a combination of a cellular communications network and a wide area network.

31. A monitoring system, the monitoring system comprising:
　a monitoring device including:
　　a location determination circuit configured to identify a first location of the monitoring device at a first time, identify a second location of the monitoring device at a second time, and identify a third location of the monitoring device at a third time; and
　　a controller circuit configured to:
　　　provide the first location to a first recipient device while operating in a first mode;
　　　receive a request to operate in a second mode;

provide the second location and the third location to the first recipient device while operating in the second mode; and provide the second location and the third location to a second recipient device without passing through the first recipient device while operating in the second mode;

the first recipient device including:
a processor;
a non-transitory computer readable medium communicably coupled to the processor and having stored therein instructions, which when executed by the processor, cause the processor to:
receive a fourth location of the second recipient device; and
identify a possible intersection location based at least in part on the second location, the third location, and the fourth location.

32. The monitoring system of claim 31, wherein the first recipient device comprises a central monitoring station, wherein the second recipient device comprises an intercept device, and wherein the request to operate in the second mode is received from the central monitoring station.

33. The monitoring system of claim 32, wherein the central monitoring station is configured to receive a user request to engage the second mode, and to generate the request to operate in the second mode.

34. The monitoring system of claim 31, wherein the location determination circuit updates location information at a first rate when operating in the first mode, and updates location information at a second rate when operating in the second mode, and wherein the first rate is less than the second rate.

35. A monitoring system, the monitoring system comprising:
a monitor device configured to:
determine a first location of the monitor device at a first time;
transmit the first location to a first recipient device while operating in a first mode;
receive a request to engage in a second mode at a second time, wherein the second time is after the first time;
determine a second location of the monitor device at a third time; and
based upon the request to engage in the second mode, transmit the second location from the monitor device directly to the first recipient device and directly to a second recipient device.

36. The system of claim 35, wherein the first recipient device comprises a central monitoring station, wherein the second recipient device comprises an intercept device, and wherein the request to operate in the second mode is received from the central monitoring station.

37. The system of claim 36, wherein the request comprises an address of the second recipient device.

38. The system of claim 35, wherein the second location is transmitted to the second recipient device via a communication network selected from a group consisting of: a wide area network, a cellular communications network, a WiFi network, a combination of a WiFi network and a cellular communications network, a combination of a WiFi network and a wide area network, a combination of a WiFi network and a cellular communications network, and a combination of a cellular communications network and a wide area network.

39. The system of claim 35, wherein the monitor device comprises a location determination circuit, and wherein determining the first location of the monitor device comprises accessing the location determination circuit which is updating location information at a first rate when operating in the first mode, and accessing the location determination circuit which is updating location information at a second rate when operating in the second mode.

* * * * *